(12) United States Patent
Yamamoto

(10) Patent No.: US 9,095,977 B2
(45) Date of Patent: Aug. 4, 2015

(54) OBJECT GRIPPING APPARATUS, CONTROL METHOD FOR OBJECT GRIPPING APPARATUS, AND STORAGE MEDIUM

(71) Applicant: CANON KABUSHIKI KAISHA, Tokyo (JP)

(72) Inventor: Takahisa Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 13/710,360

(22) Filed: Dec. 10, 2012

(65) Prior Publication Data
US 2013/0166061 A1    Jun. 27, 2013

(30) Foreign Application Priority Data

Dec. 27, 2011  (JP) .................................. 2011-286623

(51) Int. Cl.
*G06F 7/00*       (2006.01)
*B25J 9/16*       (2006.01)

(52) U.S. Cl.
CPC .............. *B25J 9/1664* (2013.01); *B25J 9/1669* (2013.01); *B25J 9/1697* (2013.01); *G05B 2219/40053* (2013.01); *G05B 2219/45063* (2013.01); *Y10S 901/02* (2013.01); *Y10S 901/47* (2013.01)

(58) Field of Classification Search
USPC ......................................................... 700/228
See application file for complete search history.

(56) References Cited

U.S. PATENT DOCUMENTS

| | | | |
|---|---|---|---|
| 5,032,975 A | 7/1991 | Yamamoto et al. | |
| 5,136,222 A | 8/1992 | Yamamoto et al. | |
| 5,530,791 A | 6/1996 | Okabayashi | |
| 6,078,663 A | 6/2000 | Yamamoto | |
| 6,597,790 B1 | 7/2003 | Yamamoto | |
| 7,071,865 B2 | 7/2006 | Shibamiya et al. | |
| 7,296,234 B2 | 11/2007 | Fukuda et al. | |
| 7,496,278 B2 | 2/2009 | Miyamoto et al. | |
| 7,522,087 B2 | 4/2009 | Shibamiya et al. | |
| 7,937,346 B2 | 5/2011 | Kato et al. | |
| 8,023,802 B2 | 9/2011 | Miyamoto et al. | |
| 2006/0149421 A1* | 7/2006 | Akiyama et al. | .............. 700/245 |

(Continued)

FOREIGN PATENT DOCUMENTS

JP    01-183395 A    7/1989
JP    05-127718 A    5/1993

(Continued)

*Primary Examiner* — Gene Crawford
*Assistant Examiner* — Kyle Logan
(74) *Attorney, Agent, or Firm* — Fitzpatrick, Cella, Harper & Scinto

(57) ABSTRACT

An object gripping apparatus comprises an imaging unit configured to capture an image of a plurality of workpieces; a workpiece state estimation unit configured to estimate positions and orientations of the plurality of workpieces from the captured image; a pickup-target workpiece selection unit configured to select a pickup-target workpiece from among the plurality of workpieces based on a result of the estimation of the workpiece state estimation unit; a workpiece pickup unit configured to grip and pick up the pickup-target workpiece in accordance with an operation path associated with a position of the pickup-target workpiece; and a path setting unit configured to determine an evacuation path along which the workpiece pickup unit that has gripped the pickup-target workpiece evacuates to the outside of an imaging range of the imaging unit based on an estimated moving time required for the evacuation.

12 Claims, 15 Drawing Sheets

(56) References Cited

U.S. PATENT DOCUMENTS

| | | | |
|---|---|---|---|
| 2007/0274812 A1* | 11/2007 | Ban et al. | 414/217 |
| 2009/0099686 A1* | 4/2009 | Yoshikawa et al. | 700/228 |
| 2009/0160424 A1 | 6/2009 | Yamamoto | |
| 2011/0191568 A1 | 8/2011 | Yamamoto | |
| 2012/0112539 A1 | 5/2012 | Yamamoto | |
| 2013/0037696 A1 | 2/2013 | Iwata et al. | |

FOREIGN PATENT DOCUMENTS

| | | |
|---|---|---|
| JP | 10-128686 A | 5/1998 |
| JP | 2006-175532 A | 7/2006 |

* cited by examiner

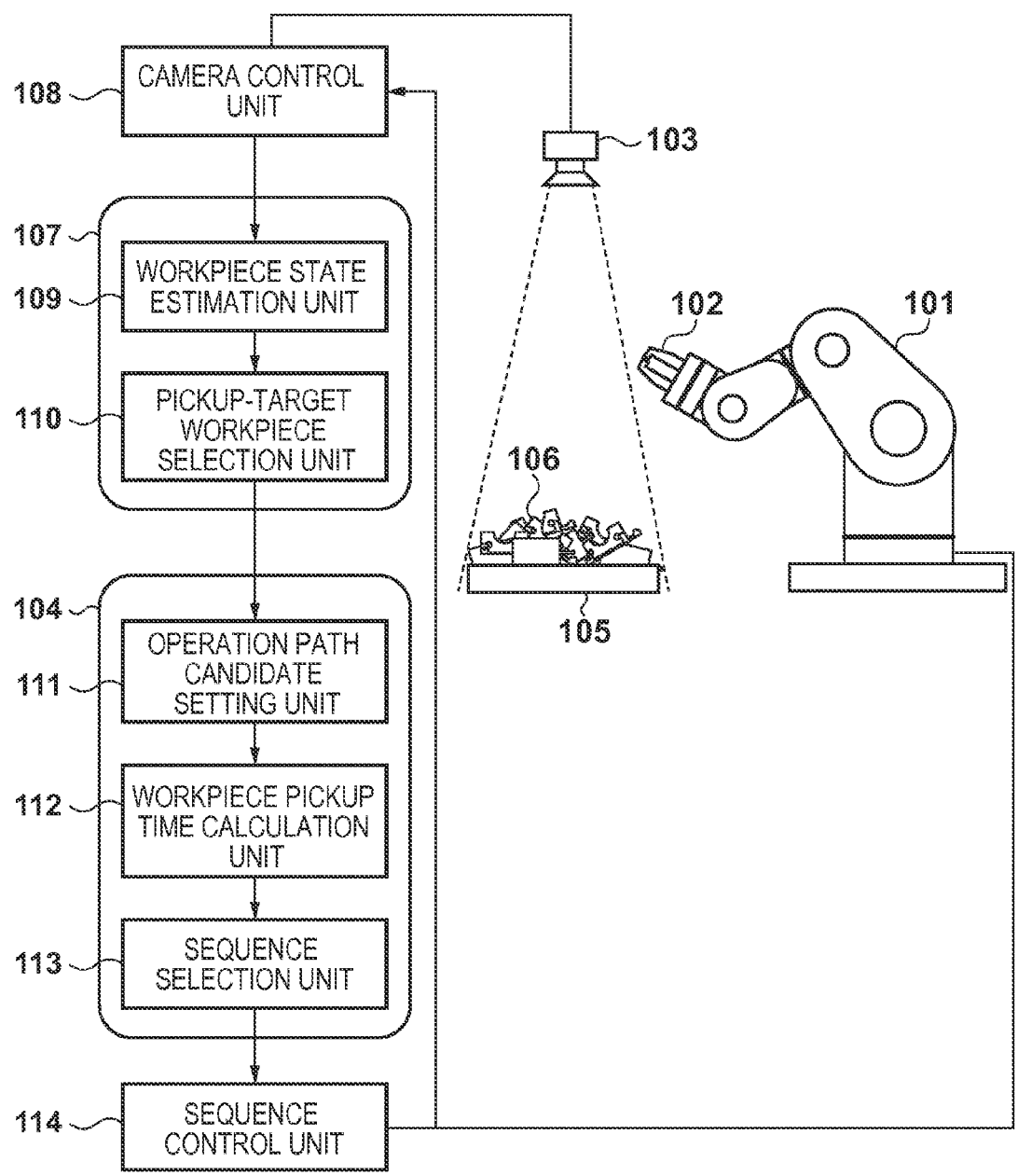

WORKPIECES THAT HAVE
ALREADY BEEN DEPOSITED

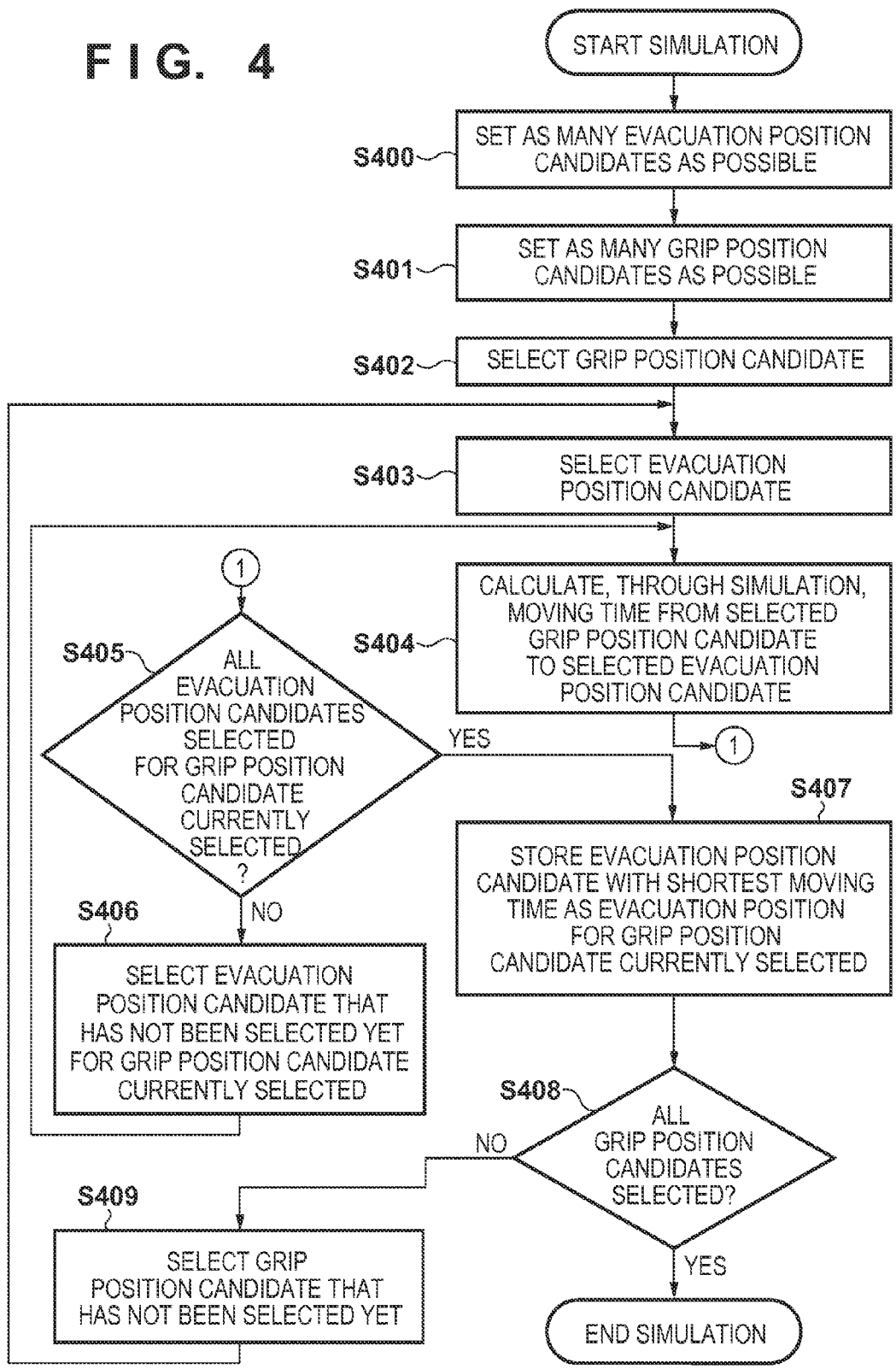

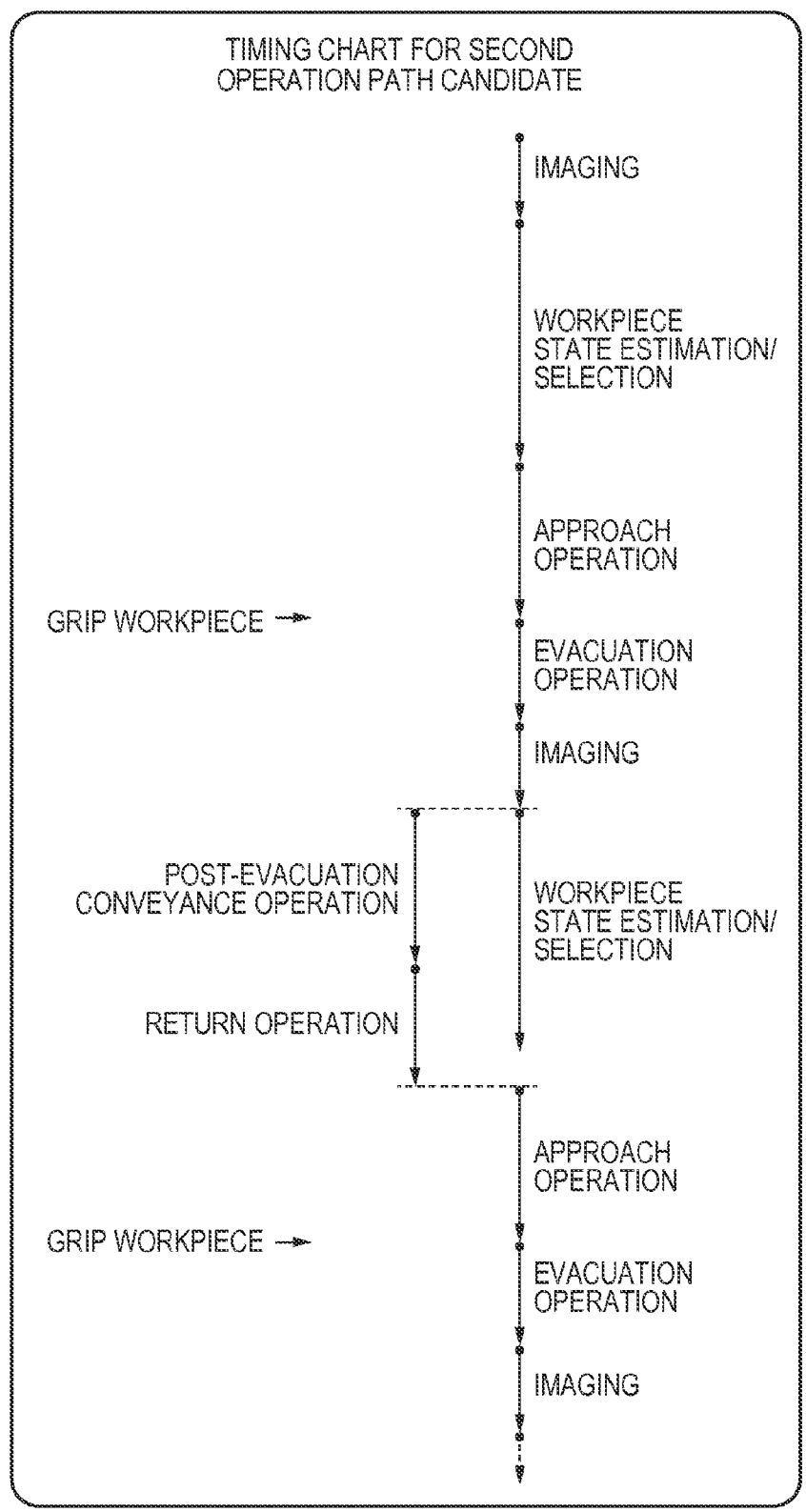

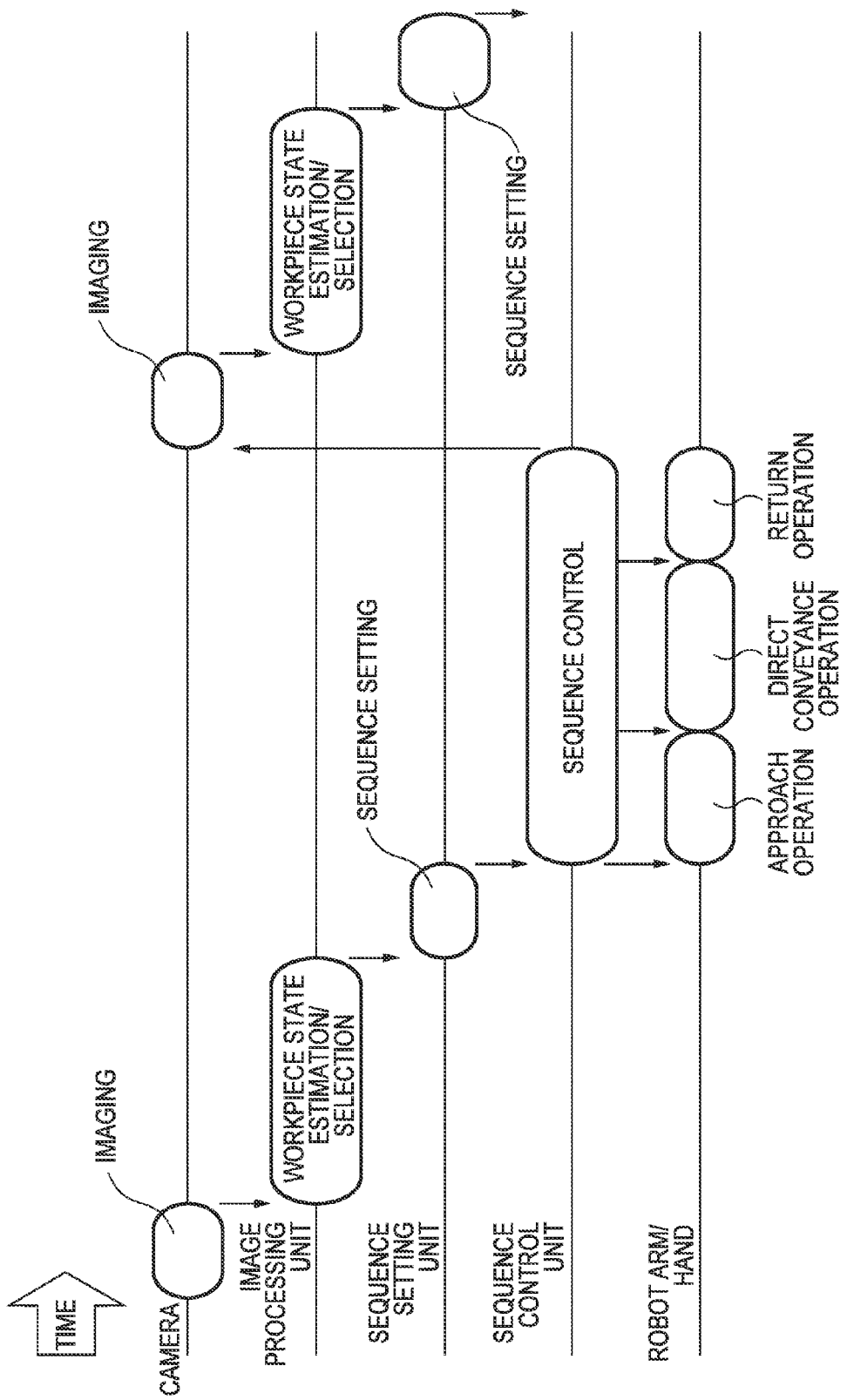

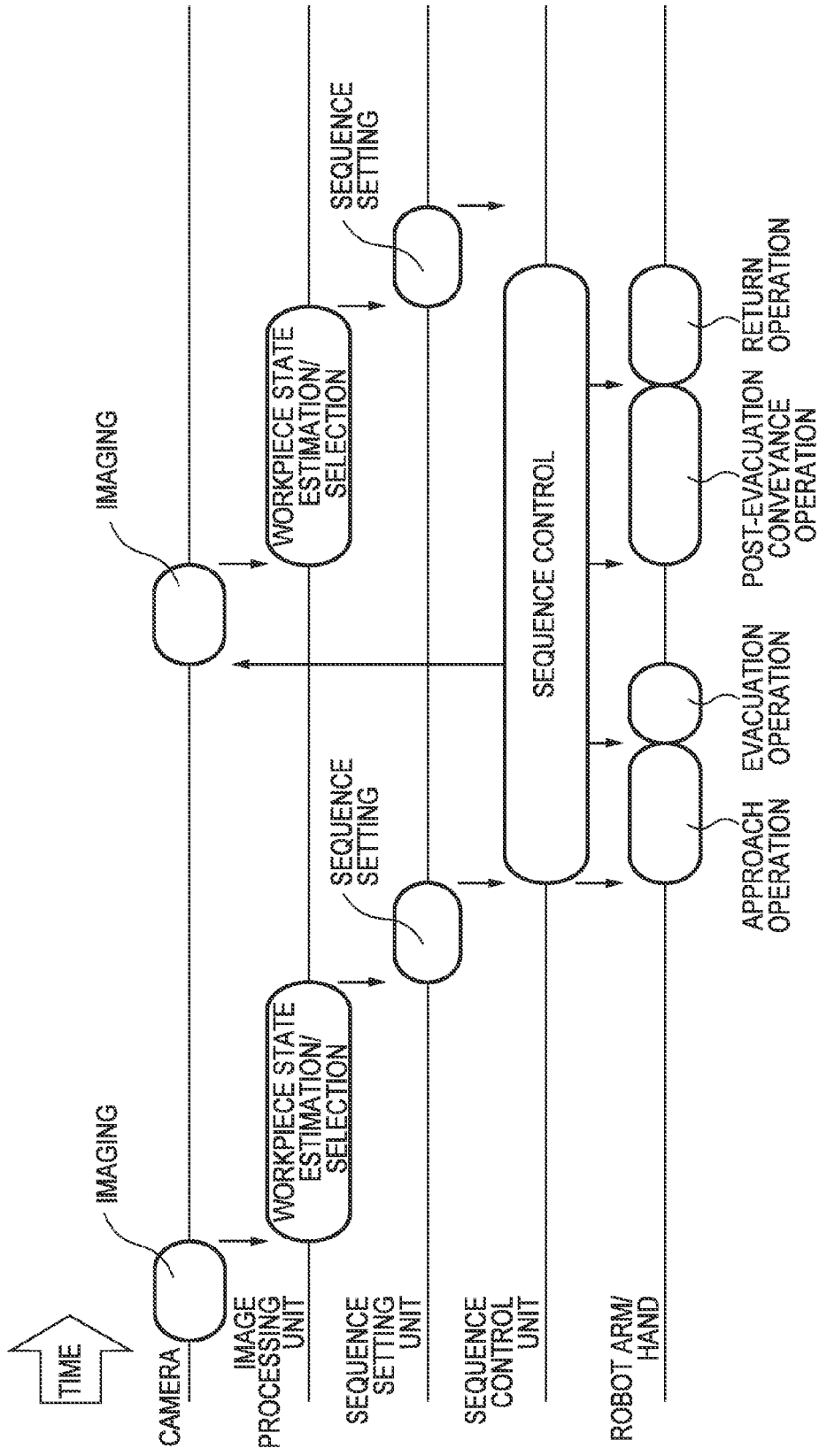

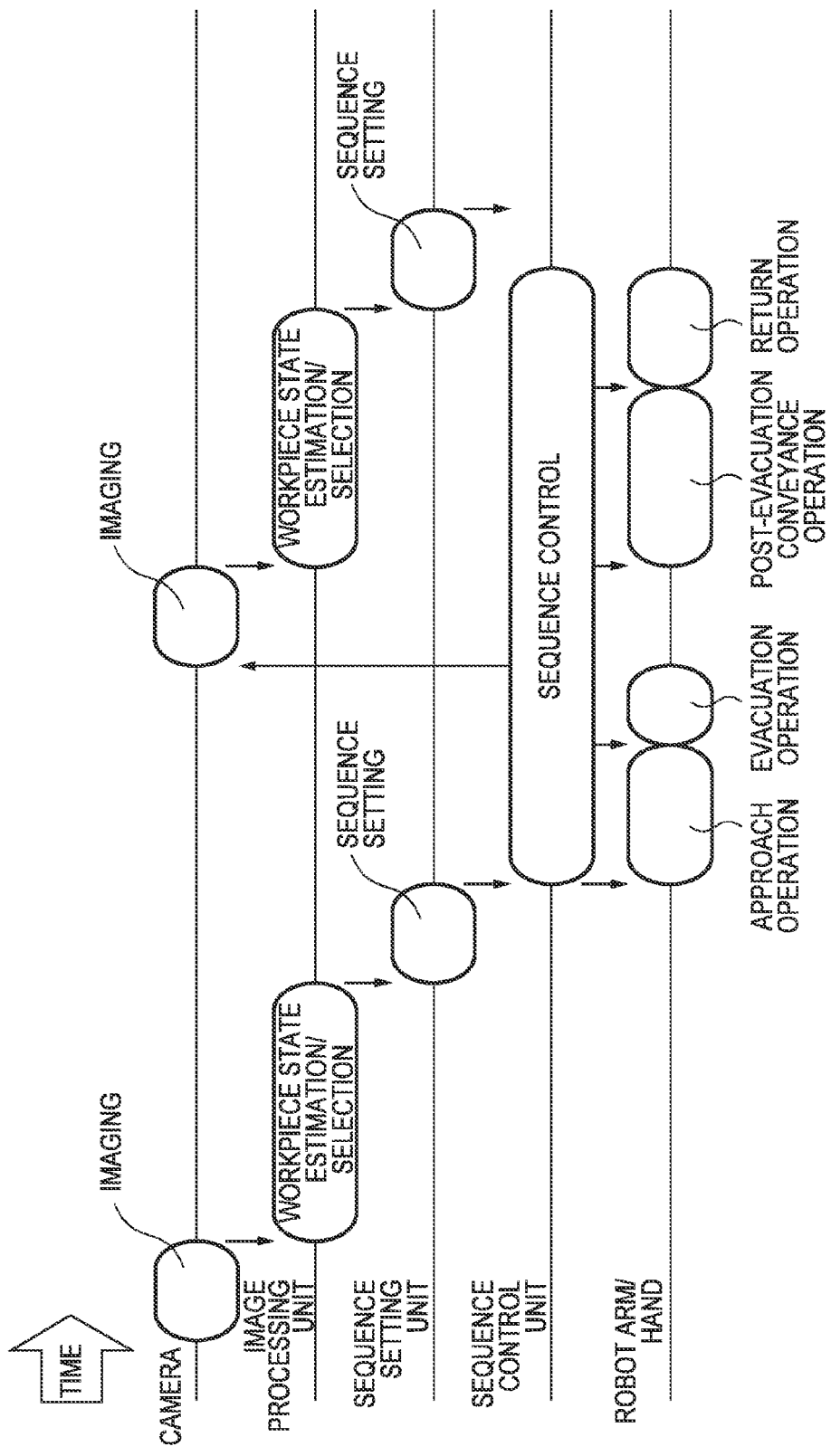

OBJECT GRIPPING APPARATUS, CONTROL METHOD FOR OBJECT GRIPPING APPARATUS, AND STORAGE MEDIUM

BACKGROUND OF THE INVENTION

1. Field of the Invention

The present invention relates to an object gripping apparatus, a control method for the object gripping apparatus, and a storage medium. In particular, the present invention relates to an object gripping apparatus that captures an image of components (workpieces) piled up in bulk (the state where a plurality of components are randomly placed) using a camera and the like, estimates the position and orientation of each workpiece from the captured image, and grips each workpiece, to a control method for the object gripping apparatus, and to a storage medium.

2. Description of the Related Art

In order to pick up a target object (target workpiece) from among workpieces piled up in bulk by controlling a robot hand, an image of the state of the workpieces piled up in bulk is captured first using a camera and the like, and then the position and orientation of a workpiece to be gripped by the robot hand are estimated using some sort of method. Thereafter, it is necessary to calculate a path along which the robot hand operates to grip the workpiece based on the estimated position and orientation of the workpiece.

In Japanese Patent Laid-Open No. 5-127718, a plurality of trajectory templates showing estimated head-trajectories of a robot hand are registered in advance, and the interference between the robot hand and obstacles is inspected based on the plurality of trajectory templates. Head-trajectories of the robot hand are generated based on trajectory templates for which it is determined that the interference does not occur as a result of the inspection.

In Japanese Patent Laid-Open No. 10-128686, a position/orientation candidate that an object could take is obtained based on an image or a range image, and based on the obtained position/orientation candidate, an environmental model is generated by dividing a space into an object space and other spaces. Based on the generated environmental model, an operation path of a robot hand for picking up a target object is generated.

In Japanese Patent Laid-Open No. 2006-175532, a plurality of different path patterns are stored in a path pattern storage unit as the approaching and leaving paths of a robot hand. Next, based on a workpiece position detected by a visual sensor, one of the plurality of path patterns stored in the path pattern storage unit is selected. The selected path pattern is modified so that the target position of the robot hand is coincident with the actual workpiece position. The modified path pattern is defined as revised approaching and leaving paths and the robot hand is moved along the revised approaching and leaving paths.

In Japanese Patent Laid-Open No. 1-183395, in order to reduce the cycle time of workpiece pickup, a shield unit is provided to a robot hand so as to allow capturing an image for pickup of the next workpiece while the robot hand is attempting to grip a workpiece. Normally, when an image is captured while the robot hand is attempting to grip a workpiece, the robot hand is captured in the image as well. This obstructs subsequent image processing. In view of this, the shield unit is provided to make easy the separation between a shielded region and an unshielded region in the image and to enable subsequent image processing.

As mentioned above, in order for a robot hand to pick up workpieces piled up in bulk in sequence, it is necessary to calculate paths along which the robot hand operates to grip the workpieces. In terms of operational efficiency, it is desired to calculate paths that enable the operation to finish in a short period of time.

However, the method described in Japanese Patent Laid-Open No. 5-127718 selects paths based on whether or not the interference with obstacles has occurred, and therefore gives no regard to selection of paths that reduce the operating time.

The method described in Japanese Patent Laid-Open No. 10-128686 generates an operation path so as to guarantee a space that a robot hand can enter between a target object to be gripped and other objects. Therefore, this method does not give any regard to selection of paths that reduce the operating time, either.

The method described in Japanese Patent Laid-Open No. 2006-175532 aims to reduce the operating time by preparing, in advance, path patterns that reduce ineffectual operations of a robot hand while avoiding the interference with other objects in accordance with the actual positions of workpieces. That is to say, the method described in Japanese Patent Laid-Open No. 2006-175532 selects path patterns based on the positions of workpieces, but not based on the length of the operating time. Furthermore, this method gives no regard to a reduction in the operating time for the case where the robot hand picks up workpieces piled up in bulk in sequence.

The method described in Japanese Patent Laid-Open No. 1-183395 reduces the cycle time of workpiece pickup by providing a shield unit to a robot hand so as to allow capturing an image for pickup of the next workpiece while the robot hand is attempting to grip a workpiece. However, this method cannot obtain an image of workpieces included in a shielded region, and therefore restricts selection of a target workpiece in the course of picking up workpieces in sequence.

The following problem exists in reducing the operating time required to pick up workpieces piled up in bulk in sequence.

In general, in order to pick up workpieces piled up in bulk in sequence, a workpiece to be picked up (target workpiece) is determined by capturing an image of the state of the workpieces piled up in bulk using a camera or the like and estimating the position and orientation of each workpiece using the captured image. Then, the robot hand is controlled to grip the target workpiece and convey the target workpiece to a designated deposit position. This procedure is repeated in sequence.

To accelerate the above operation, after the robot hand grips the target workpiece, it is necessary to capture an image for the next target workpiece as soon as possible. However, if the image is captured the moment the robot hand grips the target workpiece, the captured image includes the robot hand. This obstructs estimation of the positions and orientations of workpieces. Even if the image is captured during conveyance of the gripped target workpiece, there may be cases where the captured image includes the robot hand. This obstructs estimation of the positions and orientations of workpieces as well.

That is to say, in order to reduce the operating time required to pick up workpieces in sequence, it is necessary to operate a robot hand so that a camera can capture an image as soon as possible after a target workpiece is gripped. However, conventionally, this operation has not been taken into consideration.

SUMMARY OF THE INVENTION

In view of the above problem, the present invention provides technology for reducing the operating time in the case where a robot hand picks up workpieces in sequence.

According to one aspect of the present invention, there is provided an object gripping apparatus comprising: an imaging unit configured to capture an image of a plurality of workpieces; a workpiece state estimation unit configured to estimate positions and orientations of the plurality of workpieces from the image captured by the imaging unit; a pickup-target workpiece selection unit configured to select a pickup-target workpiece from among the plurality of workpieces based on a result of the estimation of the workpiece state estimation unit; a workpiece pickup unit configured to grip and pick up the pickup-target workpiece in accordance with an operation path associated with a position of the pickup-target workpiece; and a path setting unit configured to determine an evacuation path along which the workpiece pickup unit that has gripped the pickup-target workpiece evacuates to the outside of an imaging range of the imaging unit based on an estimated moving time required for the evacuation.

According to one aspect of the present invention, there is provided a control method for an object gripping apparatus, comprising the steps of: capturing an image of a plurality of workpieces; estimating positions and orientations of the plurality of workpieces from the image captured in the capturing step; selecting a pickup-target workpiece from among the plurality of workpieces based on a result of the estimating step; gripping and picking up the pickup-target workpiece in accordance with an operation path associated with a position of the pickup-target workpiece; and determining an evacuation path along which the workpiece pickup unit that has gripped the pickup-target workpiece evacuates to the outside of an imaging range of the imaging unit based on an estimated moving time required for the evacuation.

Further features of the present invention will be apparent from the following description of exemplary embodiments with reference to the attached drawings.

BRIEF DESCRIPTION OF THE DRAWINGS

FIG. 1 shows a configuration of an object gripping apparatus according to First Embodiment.

FIG. 4 is a flowchart of a procedure of processing for calculating an evacuation position for each grip position in First Embodiment.

FIGS. 5A and 5B are timing charts according to First Embodiment.

FIGS. 6A and 6B show operational sequences according to First Embodiment.

FIGS. 10A and 10B show operational sequences according to Second Embodiment.

DESCRIPTION OF THE EMBODIMENTS

Figure 2A:
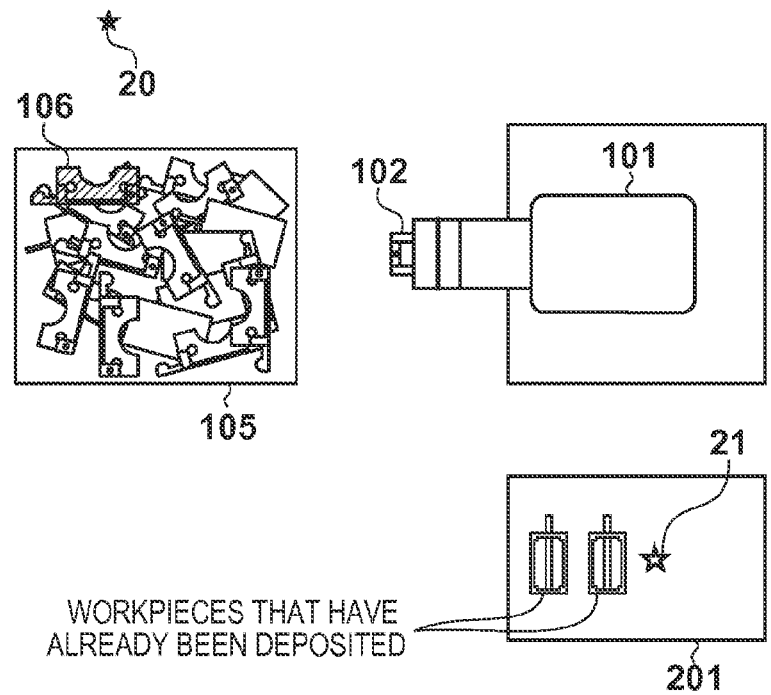
FIGS. 2A and 2B show the object gripping apparatus according to First Embodiment as viewed from the top.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

A description is now given of a configuration of an object gripping apparatus according to First Embodiment with reference to FIG. 1. The object gripping apparatus includes a robot arm 101, a hand mechanism 102 that is the end effector of the robot arm 101, a camera 103, a sequence setting unit 104, an image processing unit 107, a camera control unit 108, and a sequence control unit 114. The sequence setting unit 104 includes an operation path candidate setting unit 111, a workpiece pickup time calculation unit 112, and a sequence selection unit 113. The image processing unit 107 includes a workpiece state estimation unit 109 and a pickup-target workpiece selection unit 110.

The camera 103 is fixed in place above a frame (not shown in the figures), on the ceiling, etc. The camera 103 generates image data by capturing an image of a tray 105 and a plurality of workpieces 106 loaded on the tray 105. The camera control unit 108 controls acquisition of image data by the camera 103.

The workpiece state estimation unit 109 obtains the image captured by the camera 103 from the camera control unit 108 and performs predetermined processing so as to estimate the positions and orientations of the plurality of workpieces 106 piled up in bulk. A known method may be used to estimate the positions and orientations of the workpieces 106. For example, a method may be used whereby images of a globular space enclosing the workpieces 106 are captured from various directions, templates are generated by associating the captured images with orientation information (imaging directions on the globular space enclosing the workpieces 106, namely, latitudes and longitudes on the globular space), and the positions and orientations of the workpieces 106 are estimated by obtaining correlations between the templates and images input from the camera 103.

The pickup-target workpiece selection unit 110 determines a pickup-target workpiece (target workpiece) to be picked up by being gripped by the robot hand 102 using information on the position and orientation of each workpiece, which is the result of estimation performed by the workpiece state estimation unit 109, and reliability of that information. The pickup-target workpiece selection unit 110 also outputs information on the position and orientation of the determined target workpiece to the sequence setting unit 104. Here, a workpiece for which the reliability of position/orientation estimation performed by the workpiece state estimation unit 109 is high is selected as the pickup-target workpiece (the reliability is, for example, a correlation value obtained by correlation calculation). For example, a workpiece with the highest reliability may be selected as the pickup-target workpiece. Alternatively, the pickup-target workpiece may be selected arbitrarily from among workpieces with reliabilities larger than or equal to a predetermined value. Next, a description is given of the operations of the operation path candidate setting unit 111. First, positions related to workpiece pickup are explained with reference to FIGS. 2A and 2B.

FIG. 2A shows the vicinity of the tray 105, the robot arm 101 and the robot hand 102 of the object gripping apparatus shown in FIG. 1 as viewed from the top (from above the camera 103). In reality, the camera 103 should overlap the tray 105. However, the camera 103 is omitted from FIG. 2A to avoid complexity. Constituent elements that are the same as FIG. 1 (constituent elements that differ from FIG. 1 only in the viewing direction) are given the same reference signs thereas. It is assumed that a workpiece 106 highlighted in FIG. 2A is the target workpiece determined by the image processing unit 107 in the current pickup operation.

FIG. 2A shows the case where two workpieces have already been picked up and deposited in an aligned manner on a workpiece deposit tray 201. A white star indicates the position at which a workpiece to be picked up next should be deposited (hereinafter referred to as "deposit position 21"). The deposit position 21 can be uniquely determined as long as the position of the deposit tray 201 and the state of alignment of workpieces (e.g. the interval between workpieces that have already been deposited) are specified. In the present embodiment, it is assumed that the deposit position 21 can be calculated each time a workpiece is picked up. In FIG. 2A, a black star indicates an evacuation position 20 that will be described later.

Based on the position and orientation of the target workpiece 106 obtained from the pickup-target workpiece selection unit 110 and the calculated deposit position 21, the operation path candidate setting unit 111 sets a plurality of operation path candidates for the robot arm 101 and the robot hand 102. The operation path candidate setting unit 111 also calculates, for each candidate, the operating time required for the robot arm 101 and the robot hand 102 to operate along the associated path.

In order to explain the settings of operation paths, terms related to positions of the robot hand 102 are defined as follows. A home position of the robot hand 102 is referred to as "default position". A position at which the robot hand 102 grips the target workpiece 106 is referred to as "grip position". A position at which the robot hand 102 places the target workpiece 106 at the deposit position is simply referred to as "deposit position". An operation path starting from the default position and ending at the grip position is referred to as "approach path". A path starting from the grip position and ending at the deposit position is referred to as "conveyance path". A path starting from the deposit position and ending at the default position is referred to as "return path". The conveyance path is specifically referred to as "non-direct conveyance path" when a stopover point is specified, and as "direct conveyance path" when a stopover point is not specified.

Figure 2B:
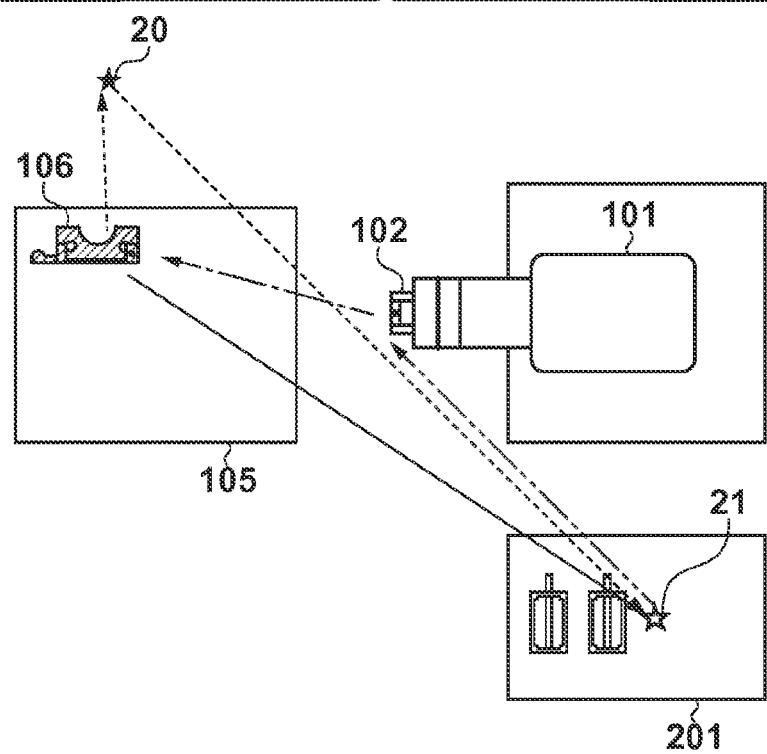

FIG. 2B shows the aforementioned paths using arrows. For example, in FIG. 2B, a line with alternate long and short dashes denotes the approach path, a solid line denotes the direct conveyance path, lines with short dashes denote the non-direct conveyance path (when the evacuation position 20 is specified as a stopover point), and a line with alternate long and two short dashes denotes the return path.

In the case where a start point and an end point are specified, a known method may be used to calculate how the robot hand 102 moves therebetween. A method may be used whereby positions between the start point and the end point are finely defined by interpolating therebetween. Similarly, in the case where a start point, an end point and a stopover point are specified, a known method may be used to calculate how the robot hand 102 moves therebetween.

Furthermore, a known method may be used to calculate the operating time required for the robot arm 101 and the robot hand 102 to move along a path defined by specified start and end points. For example, the operating time may be calculated using a simulator that has been prepared for the operation path candidate setting unit 111 to simulate the operations. Alternatively, a method may be used whereby the operating time is simulated off-line in advance for each pair of start and end points, and the result of simulation is stored as a table. When such a table is stored, there may be cases where it is not practical to store the operating time for every pair of start and end points. In such cases, a table may be prepared by quantizing the positions of start and end points to some point, and the nearest table data may be used when referring to the table.

In order to pick up the target workpiece 106 by operating the robot arm 101 and the robot hand 102, it is necessary to determine an operation path constituted by a set of the approach path, the conveyance path and the return path. When the operation path candidate setting unit 111 sets a plurality of operation path candidates, it actually sets the aforementioned set in plurality.

In the present embodiment, the operation path candidate setting unit 111 sets an operation path constituted by the approach path, the direct conveyance path and the return path as a first operation path candidate. The operation path candidate setting unit 111 also sets an operation path constituted by the approach path, the non-direct conveyance path and the return path as a second operation path candidate. The evacuation position 20 shown in FIG. 2B is specified as the stopover point for the non-direct conveyance path of the second operation path candidate. In other words, along the non-direct conveyance path of the second operation path candidate, the robot hand 102 first moves from the grip position to the evacuation position, and then moves to the deposit position.

Figure 5A:
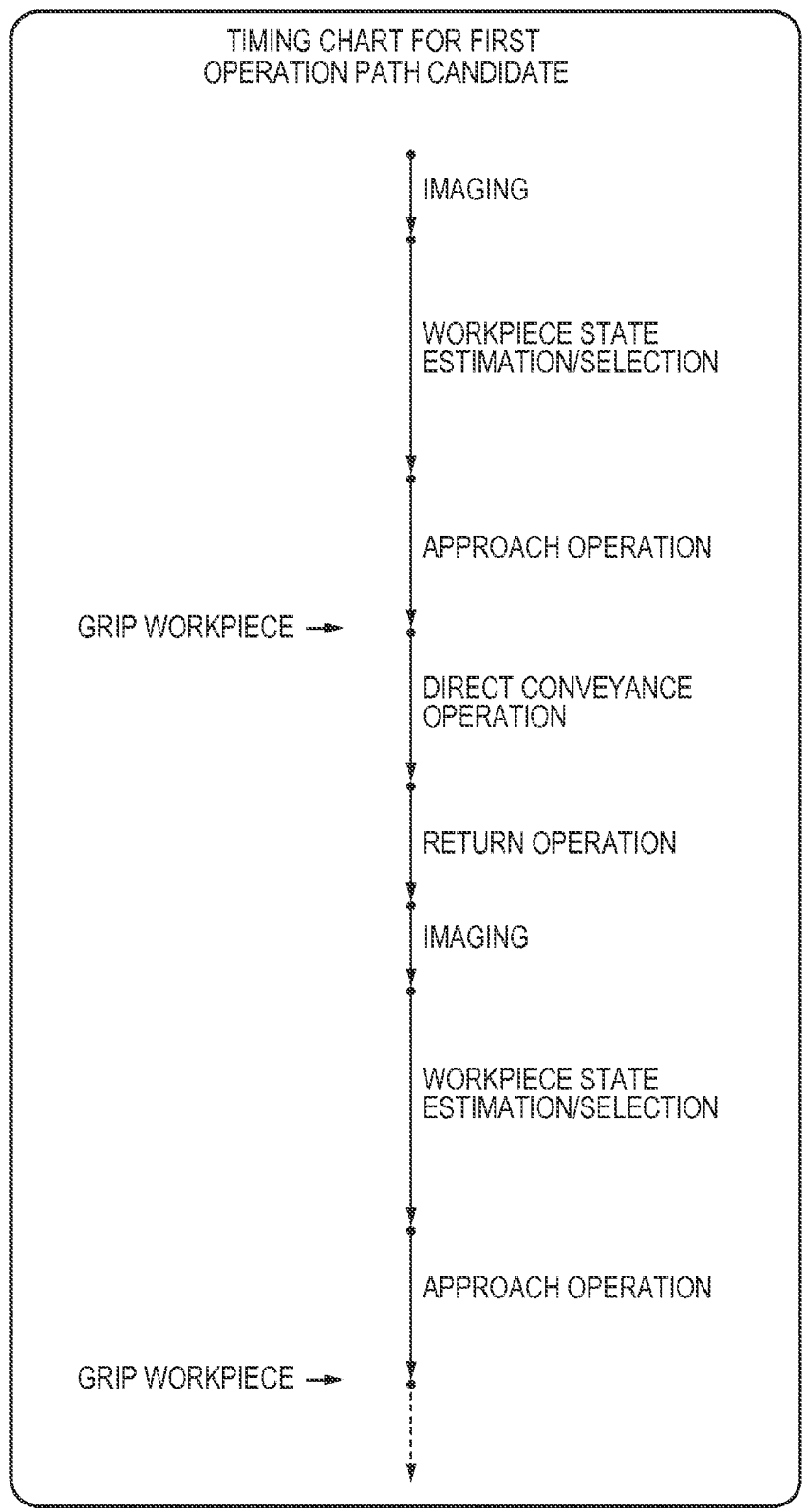

With reference to FIGS. 5A and 5B, the following describes operational sequences for the cases where the robot hand 102 operates in accordance with the first operation path candidate and the second operation path candidate.

According to the operational sequence shown in the timing chart for the first operation path candidate in FIG. 5A, after the camera 103 captures an image of a plurality of workpieces piled up in bulk, the image processing unit 107 selects a target workpiece to be gripped. Thereafter, the robot hand 102 performs an approach operation, a direct conveyance operation and a return operation along the approach path, the direct conveyance path and the return path set by the operation path candidate setting unit 111. In this way, one of the plurality of workpieces piled up in bulk can be deposited. Subsequently, workpieces are picked up in sequence by repeating the above operational sequence. This operation related to the first operation path candidate is a commonly-used sequence.

On the other hand, according to the operational sequence shown in the timing chart for the second operation path candidate in FIG. 5B, the non-direct operation path is separated into the following two types: a moving operation (evacuation operation) from the grip position to the evacuation position, and a moving operation (post-evacuation conveyance operation) from the evacuation position to the deposit position.

According to the operational sequence shown in the timing chart for the second operation path candidate in FIG. 5B, after the camera 103 captures an image of a plurality of workpieces piled up in bulk, the image processing unit 107 selects a target workpiece to be gripped. Up to this point, processing for the first operation path candidate is the same as processing for the second operation path candidate. The robot hand 102 performs an approach operation, a non-direct conveyance operation and a return operation along the approach path, the non-direct conveyance path and the return path set by the operation path candidate setting unit 111. When the robot hand 102 is at the evacuation position 20 in the midst of this sequence of operations, an image is captured for selecting the next target workpiece. That is to say, during the non-direct conveyance operation, the image is captured after the evacuation operation and before the post-evacuation conveyance operation. Note that the image is not limited to being captured after the evacuation operation and before the post-evacuation conveyance operation. When the robot hand 102 has moved outside the imaging range in the course of movement along the operation path, an image of the plurality of workpieces piled up in bulk may be newly captured for selection of the target workpiece to be picked up next. In this way, it is possible to execute a set of estimation processing of the workpiece state estimation unit 109 for estimating the positions and orientations of workpieces and selection processing of the image processing unit 107 for selecting a target workpiece to be gripped, in parallel with a set of the moving operation of the robot hand 102 from the evacuation position to the deposit position (post-evacuation conveyance operation) and the moving operation of the robot hand 102 to the default position (return operation). That is to say, the cycle time for picking up workpieces in sequence can be reduced.

A description is now given of the evacuation position 20. When the robot hand 102 arrives at the evacuation position 20, the robot arm 101 and the robot hand 102 are outside the imaging range of the camera 103. Also, the estimated moving time from the grip position to the evacuation position 20 is the shortest.

Figure 3A:
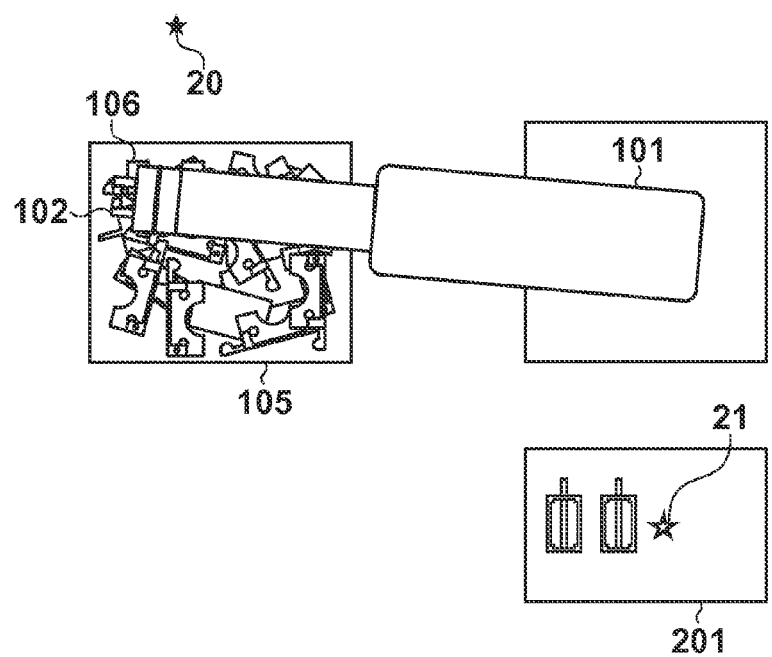
FIGS. 3A and 3B show the object gripping apparatus according to First Embodiment as viewed from the top.
Figure 3B:
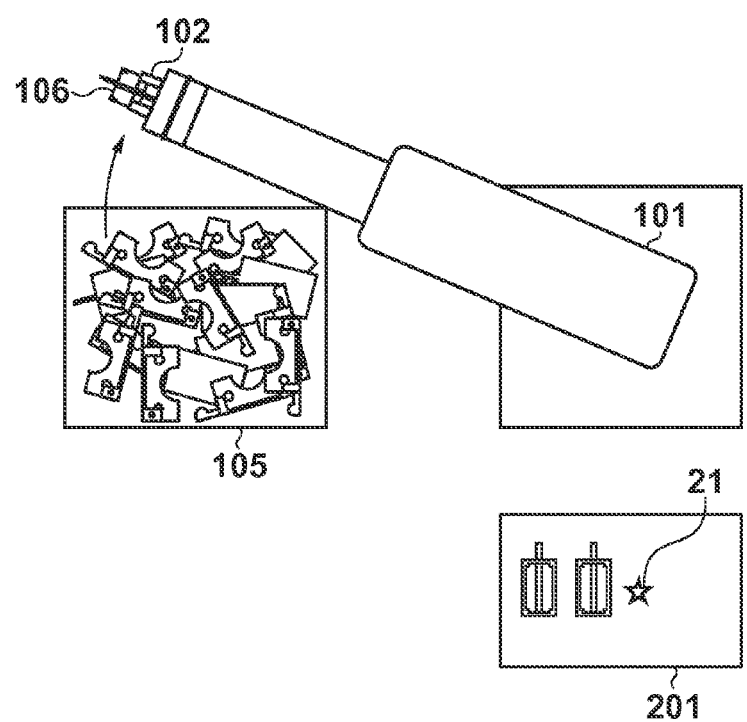

FIG. 3A shows the robot hand 102 at the grip position as viewed from the top. FIG. 3B shows the robot hand 102 at the evacuation position 20 as viewed from the top. For simplicity, the tray 105 and the imaging range of the camera 103 have the same size in the present embodiment. Therefore, in the state of FIG. 3B, the robot arm 101 and the robot hand 102 are not included in the imaging range.

As mentioned earlier, when the robot hand 102 is at the evacuation position 20, the robot arm 101 and the robot hand 102 are outside the imaging range of the camera 103, and the estimated moving time from the grip position to the evacuation position 20 is the shortest. That is to say, the evacuation position 20 varies with each grip position (the position of each target workpiece). The evacuation position 20 can be calculated for each grip position by calculating evacuation positions associated with grip positions through off-line simulation in advance, storing the result of the calculation as a table, and referring to the table.

With reference to the flowchart of FIG. 4, the following describes processing for calculating an evacuation position for each grip position through off-line simulation.

In step S400, a control unit (not shown in the figures) of the object gripping apparatus sets, as a plurality of evacuation position candidates, a plurality of positions that are in a moving range of the robot arm 101 and the robot hand 102 and at which the robot arm 101 and the robot hand 102 are outside the imaging range of the camera 103. The larger the number of the evacuation position candidates, the more accurate the calculation of the evacuation positions, and the longer the simulation time. Therefore, in the case where there are restrictions on the simulation time, the evacuation position candidates may be determined in consideration of the trade-off between the simulation time and the number of the evacuation position candidates, so as to reduce the estimated moving time required for the robot arm 101 and the robot hand 102 to move out of the imaging range of the camera 103.

In step S401, the control unit sets a plurality of grip position candidates within the tray 105. The number of the grip position candidates may also be determined in consideration of the trade-off between the simulation time and the number of the grip position candidates. For example, the number of the grip position candidates may be reduced by using a method whereby the tray 105 is divided to have a mesh-like pattern and its intersections are set as the grip position candidates.

In step S402, the control unit selects one of the plurality of grip position candidates set in step S401. In step S403, the control unit selects one of the plurality of evacuation position candidates set in step S400.

In step S404, the control unit calculates, through simulation, the estimated moving time from the grip position candidate selected in step S402 to the evacuation position candidate selected in step S403. A known method may be used to perform this simulation.

In step S405, the control unit determines whether or not all the evacuation position candidates set in S400 have been selected with respect to the grip position candidate currently selected. When it is determined that all the evacuation position candidates have been selected (the YES branch of S405), the processing moves to step S407. On the other hand, when it is determined that there are still one or more unselected evacuation position candidates (the NO branch of S405), the processing moves to step S406.

In step S406, the control unit selects an evacuation position candidate that has not been selected yet with respect to the grip position candidate currently selected. Thereafter, the processing returns to step S404. In step S407, the control unit stores, in a memory, an evacuation position candidate for which the estimated moving time calculated in step S404 with respect to the grip position candidate currently selected is the shortest as an evacuation position associated with the grip position candidate currently selected. Through the above steps, the evacuation path is set.

In step S408, the control unit determines whether or not all the grip position candidates set in step S401 have been selected. When it is determined that all the grip position candidates have been selected (the YES branch of S408), the simulation processing ends. On the other hand, when it is determined that there are still one or more unselected grip position candidates (the NO branch of S408), the processing moves to step S409. In step S409, the control unit selects a grip position candidate that has not been selected yet. Thereafter, the processing returns to step S403 and selection of an evacuation position candidate is newly started. This completes the processes in the flowchart of FIG. 4.

After the evacuation position has been calculated for each grip position in accordance with the procedure shown in the flowchart of FIG. 4, the result of calculation is prepared as a table for the operation path candidate setting unit 111. The evacuation position can be obtained by calculating a grip position from the position and orientation of the target workpiece 106 obtained from the pickup-target workpiece selection unit 110 and cross-referencing the calculated grip position with the table. In the case where the grip positions prepared as the table are not finely sampled (e.g. in the case where the tray 105 is divided to have a mesh-like pattern as described above), the operation path candidate setting unit 111 may obtain an evacuation position associated with a grip position closest to the calculated grip position (from among the grip positions prepared as the table).

Once the evacuation position has been obtained, the operating time required for the robot hand 102 to move from the grip position to the evacuation position, or from the evacuation position to the deposit position, can be calculated using a known method. The operating time required for the robot hand 102 to move from the grip position to the evacuation position is referred to as "evacuation time". The operating time required for the robot hand 102 to move from the evacuation position to the deposit position is referred to as "post-evacuation conveyance time". Note that the values calculated in S404 through the off-line simulation shown in FIG. 4 may be stored in a table and used as the "evacuation time", i.e. the operating time from the grip position to the evacuation position.

In the above manner, the operation path candidate setting unit 111 can calculate the operating time required for the robot hand 102 to move along the first operation path candidate (the approach path, the direct conveyance path and the return path) on a per-path basis. Similarly, the operation path candidate setting unit 111 can also calculate the operating time required for the robot hand 102 to move along the second operation path candidate (the approach path, the non-direct conveyance path and the return path) on a per-path basis. The operation path candidate setting unit 111 outputs these operation times calculated on a per-path basis to the workpiece pickup time calculation unit 112 that will be described later. More specifically, in connection with the first operation path candidate, the operation path candidate setting unit 111 outputs the operating time along the approach path, the operating time along the direct conveyance path and the operating time along the return path to the workpiece pickup time calculation unit 112. Furthermore, in connection with the second operation path candidate, the operation path candidate setting unit 111 outputs the operating time along the approach path, the operating time along the non-direct conveyance path and the operating time along the return path to the workpiece pickup time calculation unit 112. With regard to the operating time along the non-direct conveyance path of the second operation path candidate, the evacuation time and the post-evacuation conveyance time are output to the workpiece pickup time calculation unit 112.

The workpiece pickup time calculation unit 112 estimates the time required between when the robot hand 102 grips a certain workpiece and when the robot hand 102 grips the next workpiece (hereinafter referred to as "workpiece pickup time") based on the operating times of the first and second operation path candidates obtained from the operation path candidate setting unit 111 (and calculated on a per-path basis).

The workpiece pickup time is estimated with the assumption of the sequences shown in FIGS. 5A and 5B. In the case of the first operation path candidate, as shown in FIG. 5A, the workpiece pickup time is the sum of the following times after a certain workpiece has been gripped: the time required for the direct conveyance operation; the time required for the return operation; the time required for imaging; the time required for estimation of the state of workpieces and workpiece selection; and the time required for the approach operation.

In the case of the second operation path candidate, as shown in FIG. 5B, the workpiece pickup time is the sum of the following times after a certain workpiece has been gripped: the time required for the evacuation operation; the time required for imaging; the longer of the time required for estimation of the state of workpieces and workpiece selection and the sum of the time required for the post-evacuation conveyance operation and the time required for the return operation; and the time required for the approach operation. The reason why the longer of the time required for estimation of the state of workpieces and workpiece selection and the sum of the time required for the post-evacuation conveyance operation and the time required for the return operation is used is because the approach operation can be started only when both processes have been completed. For example, in the case of FIG. 5B, the calculation is performed using the sum of the time required for the post-evacuation conveyance operation and the time required for the return operation, but not using the time required for estimation of the state of workpieces and workpiece selection. Conversely, when the time required for estimation of the state of workpieces and workpiece selection is longer than the sum of the time required for the post-evacuation conveyance operation and the time required for the return operation, the calculation is performed using the time required for estimation of the state of workpieces and workpiece selection.

The workpiece pickup time calculation unit 112 obtains, from the operation path candidate setting unit 111, the operating times required for the movement of the robot hand 102 on a per-path basis. Accordingly, as long as the time required for the camera 103 to capture an image and the time required for the image processing unit 107 to estimate the state of workpieces and to select a workpiece are obtained, the workpiece pickup times of the first and second operation path candidates can be calculated.

Out of these, the time required for the camera 103 to capture an image can be obtained by measuring the same in advance. The time required for estimation of the state of workpieces and workpiece selection can also be obtained by measuring the same in advance. Alternatively, when the time required for estimation of the state of workpieces and workpiece selection varies with each image, the processing time that the image processing unit 107 required when picking up the previous workpiece may be used as a substitute.

The workpiece pickup time calculation unit 112 calculates the workpiece pickup times that the robot hand 102 requires in association with the first and second operation path candidates in the above-described manner, and outputs the result of calculation to the sequence selection unit 113.

The sequence selection unit 113 compares the two workpiece pickup times obtained from the workpiece pickup time calculation unit 112, and selects a sequence associated with the shorter workpiece pickup time (operation path selection processing). The sequence selection unit 113 also outputs the result of the selection to the sequence control unit 114.

The sequence control unit 114 controls the robot arm 101 and the robot hand 102 in accordance with the sequence obtained from the sequence selection unit 113. The sequence control unit 114 also controls the camera control unit 108 so that the camera 103 captures images at predetermined timings. By the sequence control unit 114 controlling the operations of the robot arm 101 and the robot hand 102, the workpieces 106 loaded on the tray 105 in bulk can be gripped and picked up in sequence.

This concludes the description of the configuration of the object gripping apparatus shown in FIG. 1 according to the present embodiment.

A description is now given of the operations of the object gripping apparatus according to the present embodiment with reference to FIGS. 6A and 6B. FIG. 6A shows the operations for the case where the first operation path has been selected by the sequence setting unit 104. FIG. 6B shows the operations for the case where the second operation path has been selected by the sequence setting unit 104. The operations for capturing an image of workpieces piled up in bulk using the camera 103, selecting a target workpiece using the image processing unit 107, and selecting an operation path using the sequence setting unit 104 are the same both in FIGS. 6A and 6B. These operations are followed by the remaining operations of FIG. 6A or FIG. 6B, depending on the result of selection of the operation path by the sequence setting unit 104.

When the sequence setting unit 104 has selected the first operation path, the robot arm 101 and the robot hand 102 perform operations along the approach path, the direct conveyance path and the return path under control of the sequence control unit 114 as shown in FIG. 6A. Through this sequence of operations, a target workpiece can be picked up from among workpieces piled up in bulk and placed at the deposit position. Thereafter, the camera 103 captures an image of workpieces piled up in bulk again so as to pick up the workpieces in sequence.

When the sequence setting unit 104 has selected the second operation path, the robot arm 101 and the robot hand 102 perform operations along the approach path, the non-direct conveyance path (evacuation operation and post-evacuation conveyance operation) and the return path under control of the sequence control unit 114 as shown in FIG. 6B. Through this sequence of operations, a target workpiece can be picked up from among workpieces piled up in bulk and placed at the deposit position. In this case, the sequence control unit 114 controls the camera 103 to capture an image of workpieces piled up in bulk when the robot arm 101 and the robot hand 102 are at the evacuation position. Here, selection of a target workpiece by the image processing unit 107 is performed in parallel with the post-evacuation conveyance operation and the return operation of the robot hand 102.

As has been described above, in the present embodiment, the sequence setting unit 104 sets a plurality of operation path candidates for the robot arm 101 and the robot hand 102. Furthermore, an operation path along which the actual operation is performed is selected from among the plurality of operation path candidates so as to reduce the time required from when a certain workpiece is gripped to when the next workpiece is gripped (workpiece pickup time). As a result, in the case where workpieces are picked up in sequence, the operating time can be reduced. In particular, a path along which the robot arm 101 and the robot hand 102 evacuate from the imaging region of the camera and then convey a workpiece to a workpiece deposit region is included among the operation path candidates. This way, an image of workpieces piled up in bulk can be obtained while the robot arm 101 and the robot hand 102 are evacuating from the imaging region of the camera. Accordingly, the conveyance operation for conveying the evacuated target workpiece to the workpiece deposit region can be performed in parallel with estimation of the state of the workpieces piled up in bulk using the obtained image. This enables a reduction in the operating time.

(Second Embodiment)

According to First Embodiment, in the operational sequence for the case where the first operation path has been selected, the next image is captured after the robot hand 102 has completed the return operation (see FIGS. 5A and 6A). The present embodiment describes, as the operational sequence for the case where the first operation path has been selected, an example in which the imaging is started the moment the robot hand 102 moves out of the imaging range of the camera 103 even during the direct conveyance operation or the return operation.

Figure 7:
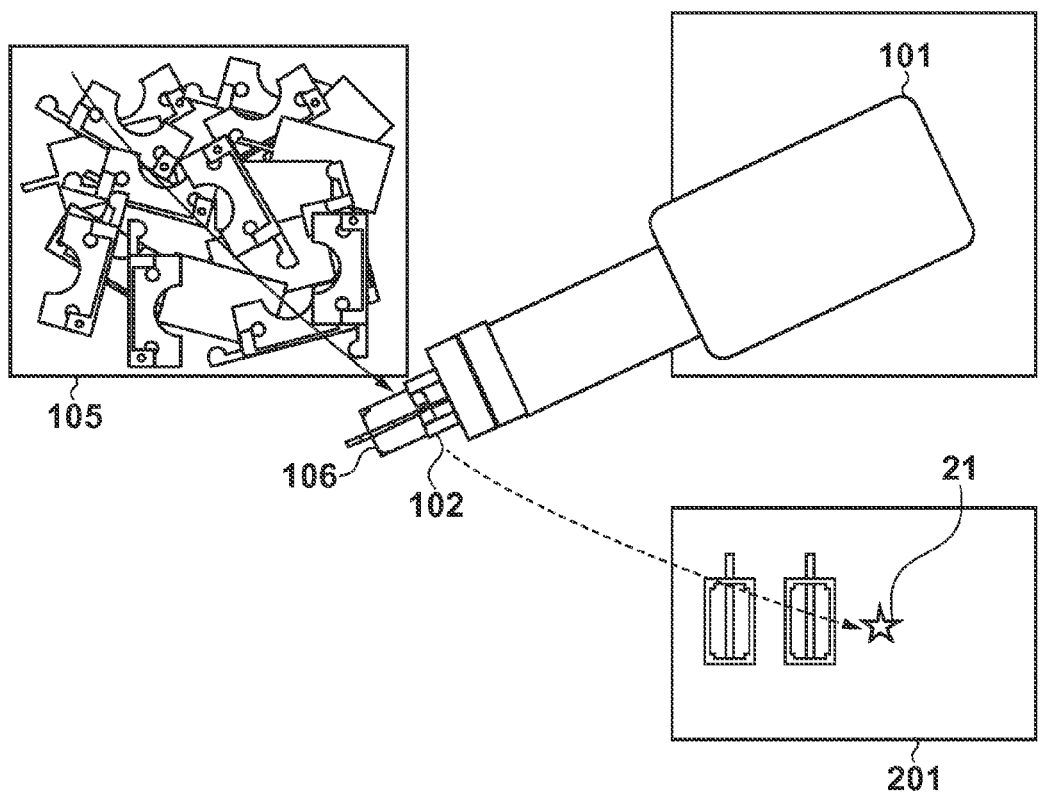
FIG. 7 shows an object gripping apparatus according to Second Embodiment as viewed from the top.

FIG. 7 illustrates the moment when the robot hand 102 moves out of the imaging range of the camera 103 during the direct conveyance operation from the grip position to the deposit position 21 as viewed from the top. The position at which the robot hand 102 is present the moment it moves out of the imaging range of the camera 103 is referred to as "out-of-frame position during conveyance". In the present embodiment, it is assumed that the camera 103 starts the imaging at this moment in the operational sequence for the case where the first operation path has been selected.

Figure 9:
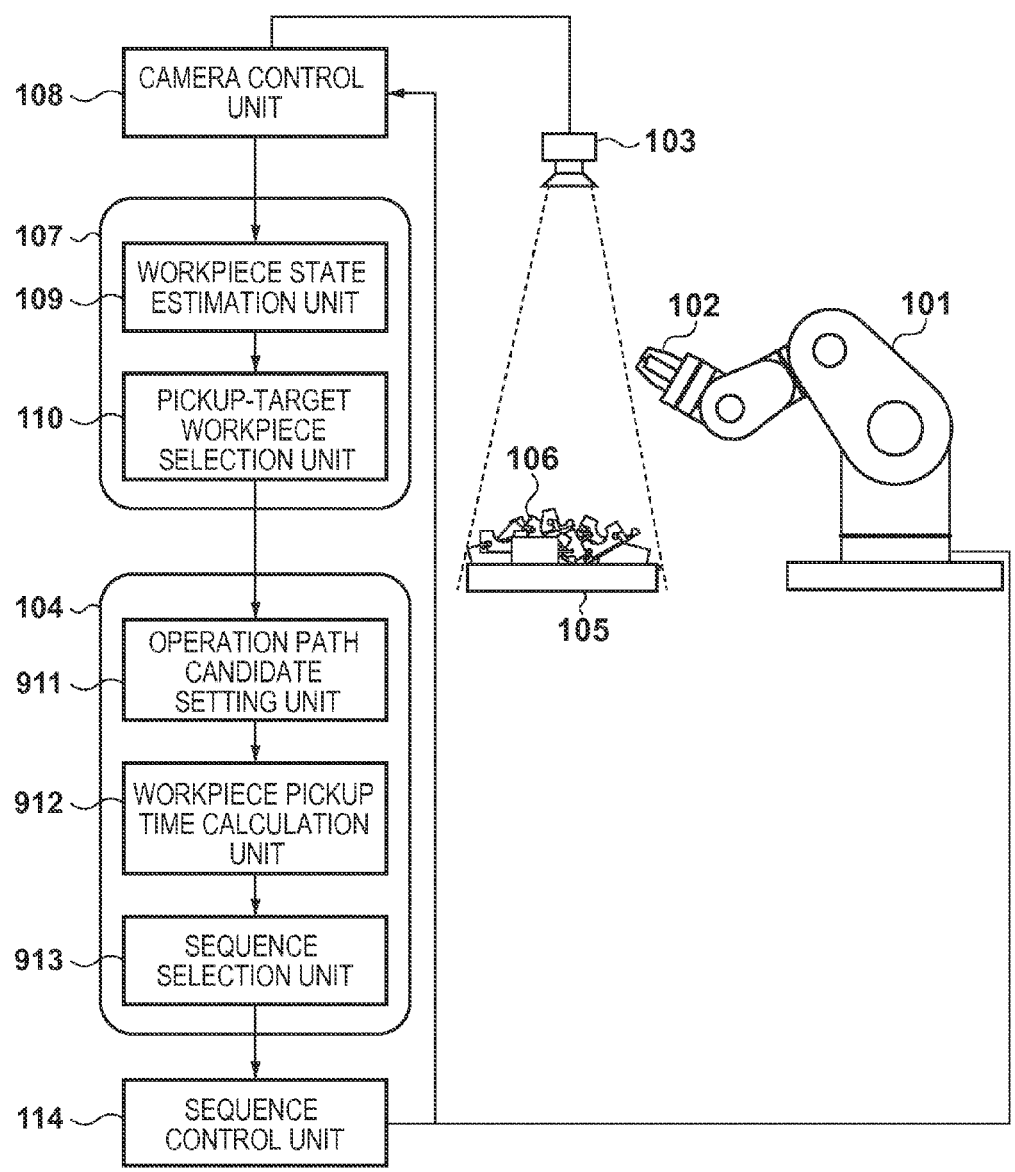
FIG. 9 shows a configuration of the object gripping apparatus according to Second Embodiment.

A description is now given of a configuration of an object gripping apparatus according to Second Embodiment with reference to FIG. 9. As with First Embodiment, the object gripping apparatus includes a robot arm 101, a hand mechanism 102 that is the end effector of the robot arm 101, a camera 103, a sequence setting unit 104, an image processing unit 107, a camera control unit 108, and a sequence control unit 114. As with First Embodiment, the image processing unit 107 includes a workpiece state estimation unit 109 and a pickup-target workpiece selection unit 110. Unlike First Embodiment, the sequence setting unit 104 includes an operation path candidate setting unit 911, a workpiece pickup time calculation unit 912, and a sequence selection unit 913.

The operation path candidate setting unit 911 calculates the operating time required for the robot hand 102 to move from the grip position (position of a target workpiece) to the out-of-frame position during conveyance. The out-of-frame position during conveyance varies with each grip position. Therefore, provided that grip positions and out-of-frame positions during conveyance are inspected and prepared as a table in advance, the out-of-frame position during conveyance can be determined as long as the grip position has been determined. Once the out-of-frame position during conveyance has been determined, the operating time can be calculated by performing simulation using a known method as in First Embodiment, with the grip position, the deposit position and the out-of-frame position during conveyance serving as the start point, the end point and the stopover point, respectively.

As with the operation path candidate setting unit 111 described in First Embodiment, the operation path candidate setting unit 911 calculates the operating times of the first operation path candidate and the second operation path candidate on a per-path basis. As has been described above, the operation path candidate setting unit 911 also calculates the operating time required for the robot hand 102 to move from the grip position to the out-of-frame position during conveyance. The operation path candidate setting unit 911 outputs these operating times calculated on a per-path basis to the workpiece pickup time calculation unit 912.

Figure 8A:
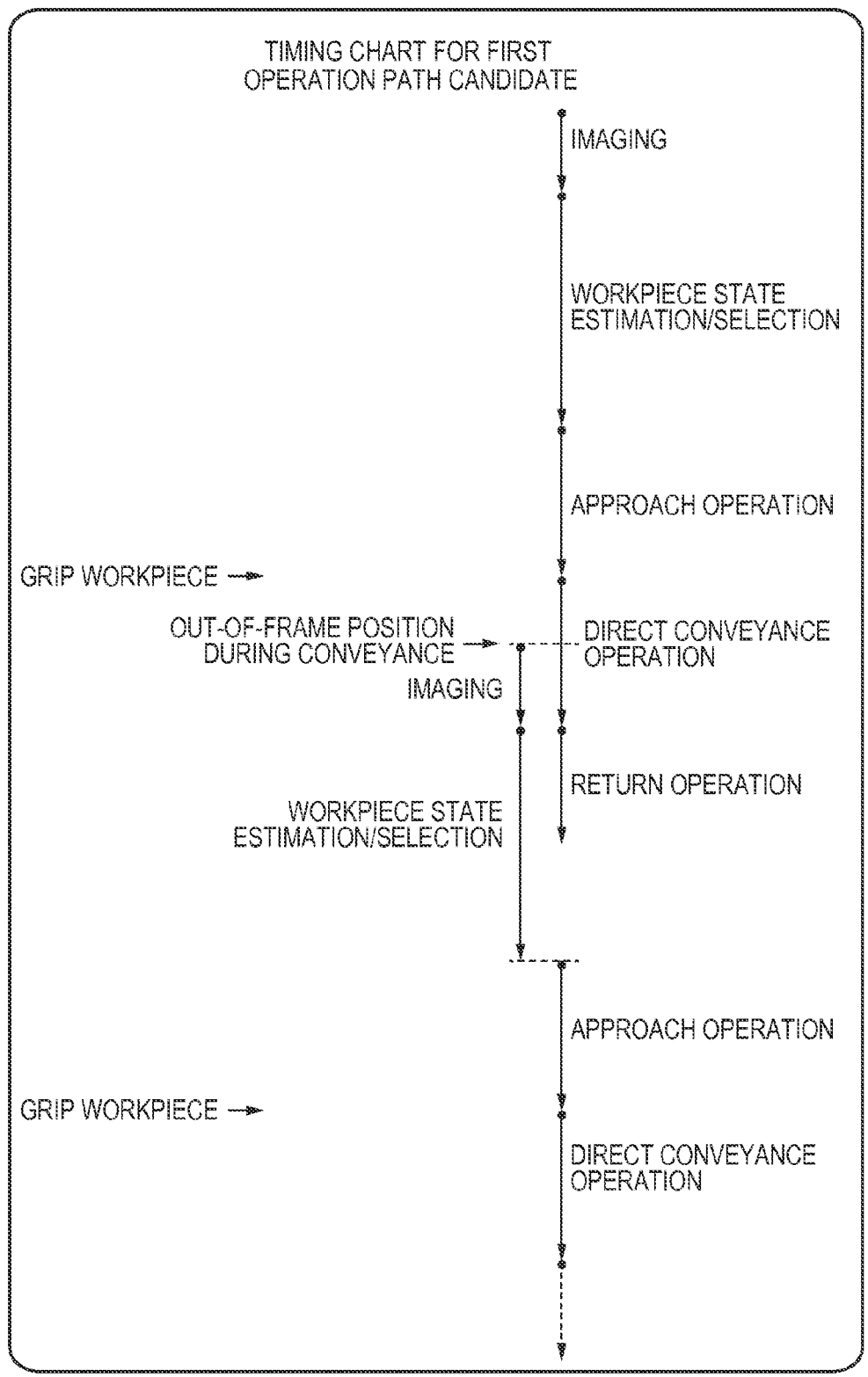
FIGS. 8A and 8B are timing charts according to Second Embodiment.
Figure 8B:
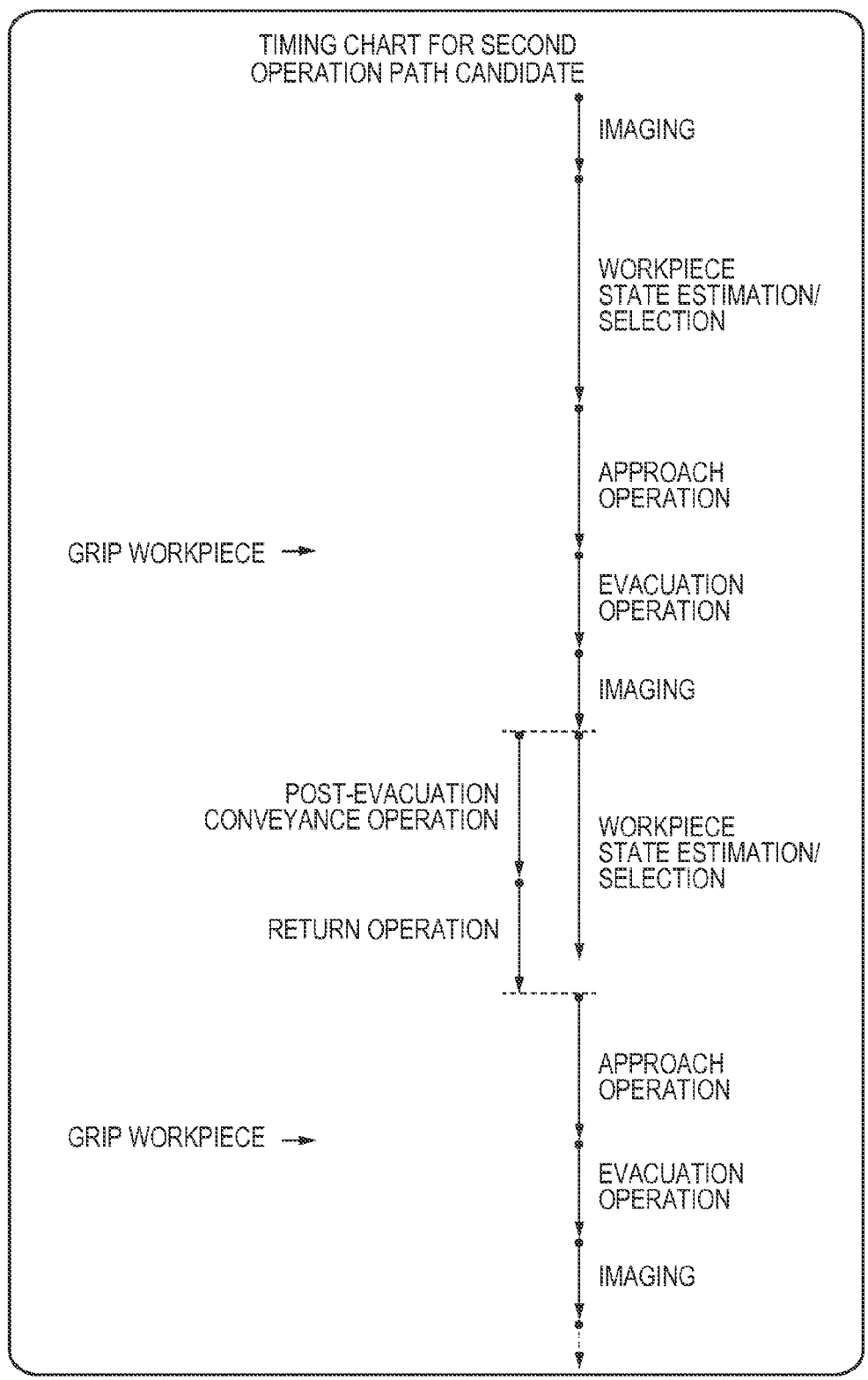

With reference to FIGS. 8A and 8B, the following describes operational sequences for the cases where the robot hand 102 operates in accordance with the first operation path candidate and the second operation path candidate. Note that the timing chart for the second operation path candidate in FIG. 8B is similar to FIG. 5B. According to the operational sequence shown in the timing chart for the first operation path candidate in FIG. 8A, the robot hand 102 operates along the approach path, the direct conveyance path and the return path set by the operation path candidate setting unit 911. When the robot hand 102 arrives at the out-of-frame position during conveyance in the midst of this sequence of operations, an image for selection of the next target workpiece is captured. In this way, the cycle time can be reduced compared to the case of the operations of the first operation path candidate according to First Embodiment.

As with the workpiece pickup time calculation unit 112 described in First Embodiment, the workpiece pickup time calculation unit 912 estimates the time (workpiece pickup time) required from when the robot hand 102 grips a certain workpiece to when the robot hand 102 grips the next workpiece based on the operating times of the first and second operation path candidates obtained from the operation path candidate setting unit 911.

Note that in the present embodiment, the operating time of the first operation path candidate is estimated in accordance with a sequence in which the camera 103 captures an image for pickup of the next workpiece during the direct conveyance operation. That is to say, the camera 103 starts the imaging the moment the robot hand 102 arrives at the out-of-frame position during conveyance. In this case, the imaging of the camera 103 is performed in parallel with (a part of) the direct conveyance operation or the return operation. The workpiece pickup time is calculated using the longest of the operating times required for these parallel operations. For example, in the case of FIG. 8A, the calculation is performed using the time required for estimation of the state of workpieces and workpiece selection, but not using the time required for the direct conveyance operation (a part that follows the out-of-frame position during conveyance), the return operation and the imaging.

The workpiece pickup time calculation unit 912 calculates the workpiece pickup time required for the robot hand 102 to follow the first operation path and the workpiece pickup time required for the robot hand 102 to follow the second operation path, and outputs the calculated workpiece pickup times to the sequence selection unit 913.

The sequence selection unit 913 compares the two workpiece pickup times obtained from the workpiece pickup time calculation unit 912, and selects a sequence associated with the shorter workpiece pickup time. The sequence selection unit 913 also outputs the result of the selection to the sequence control unit 114.

Figure 10A:
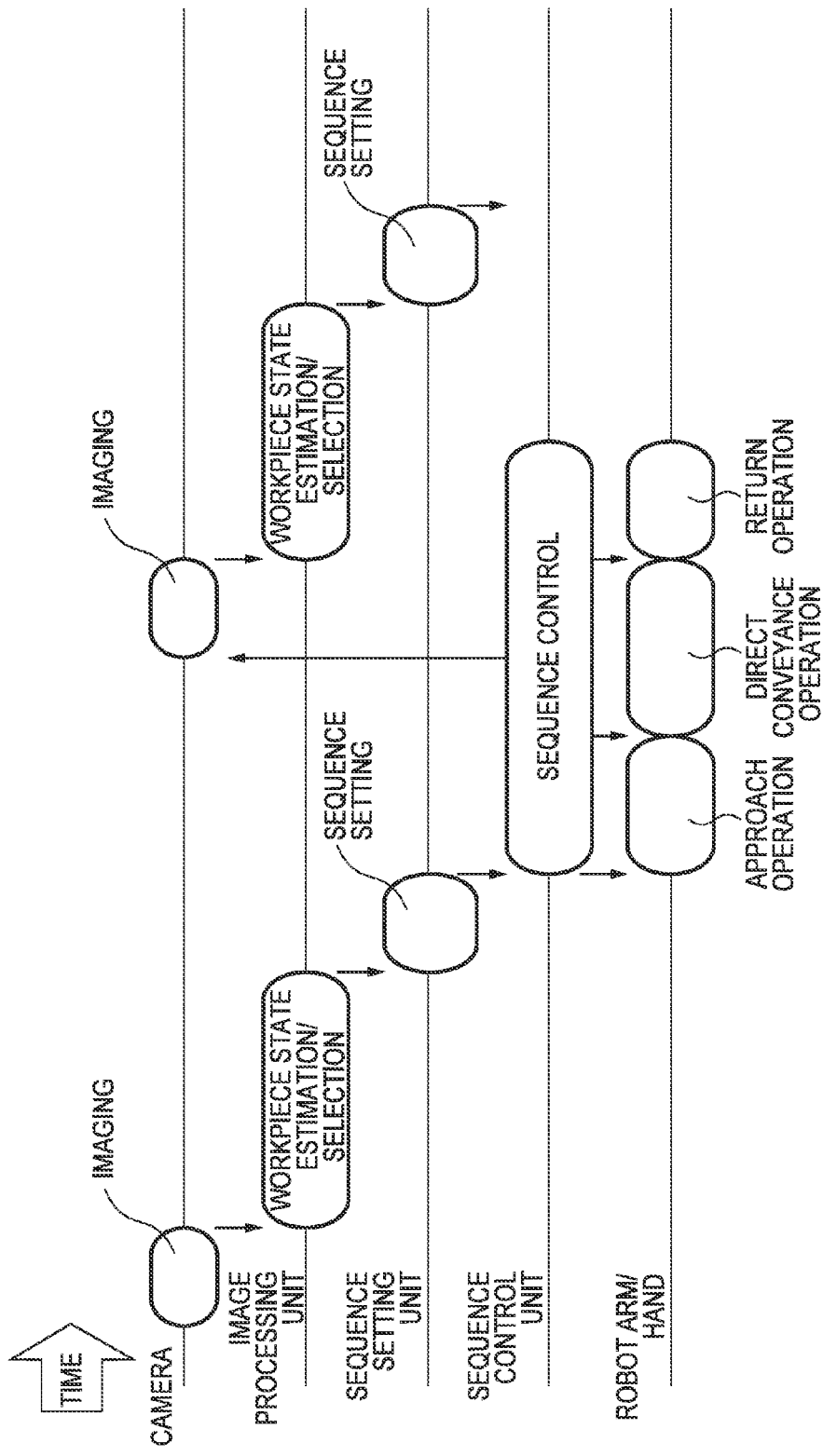

A description is now given of the operations of the object gripping apparatus according to the present embodiment with reference to FIGS. 10A and 10B. FIG. 10A shows the operations for the case where the first operation path has been selected by the sequence setting unit 104. FIG. 10B shows the operations for the case where the second operation path has been selected by the sequence setting unit 104. Note that FIG. 10B is the same as FIG. 6B. The operations for capturing an image of workpieces piled up in bulk using the camera 103, selecting a target workpiece using the image processing unit 107, and selecting an operation path using the sequence setting unit 104 are the same both in FIGS. 10A and 10B. These operations are followed by the remaining operations of FIG. 10A or FIG. 10B, depending on the result of selection of the operation path by the sequence setting unit 104.

When the sequence setting unit 104 has selected the first operation path, the robot arm 101 and the robot hand 102 perform operations along the approach path, the direct conveyance path and the return path under control of the sequence control unit 914 as shown in FIG. 10A. Through this sequence of operations, a target workpiece can be picked up from among workpieces piled up in bulk and placed at the deposit position. In this case, the sequence control unit 114 controls the camera 103 to capture an image of the workpieces piled up in bulk when the robot arm 101 and the robot hand 102 are at the out-of-frame position during conveyance. Here, selection of a target workpiece by the image processing unit 107 is performed in parallel with the direct conveyance operation and the return operation of the robot hand 102.

When the sequence setting unit 104 has selected the second operation path, the operations similar to First Embodiment are performed as shown in FIG. 10B. This concludes the description of the operations of the object gripping apparatus according to the present invention.

As has been described above, in the present embodiment, the sequence setting unit 104 sets a plurality of operation path candidates for the robot arm 101 and the robot hand 102. These operation path candidates set in the present embodiment have the possibility of reducing the workpiece pickup time compared to First Embodiment. As a result, the present embodiment has the possibility of reducing the operating time required to pick up workpieces in sequence compared to First Embodiment.

(Third Embodiment)

In First Embodiment and Second Embodiment, the evacuation position varies with each grip position (the position of each target workpiece). The present embodiment describes the case where the evacuation position is fixed irrespective of grip positions. Note that a configuration of an object gripping apparatus according to the present embodiment is similar to the configuration described in First Embodiment, and therefore a description thereof is omitted from the following description.

In the present embodiment, when the robot hand 102 arrives at the evacuation position, the robot arm 101 and the robot hand 102 are out of the imaging range of the camera 103. As the evacuation position is fixed in the present embodiment, it is not necessary to calculate the evacuation position for each grip position through off-line simulation and to store a table showing the result of the calculation as described in First Embodiment with reference to the flowchart of FIG. 4.

In the present embodiment, the operation path candidate setting unit 111 sets an operation path constituted by the approach path, the direct conveyance path and the return path as a first operation path candidate. This is the same as First Embodiment. The operation path candidate setting unit 111 also sets an operation path constituted by the approach path, the non-direct conveyance path and the return path as a second operation path candidate. A fixed evacuation position is specified as the stopover point for the non-direct conveyance path of the second operation path candidate.

Figure 11:
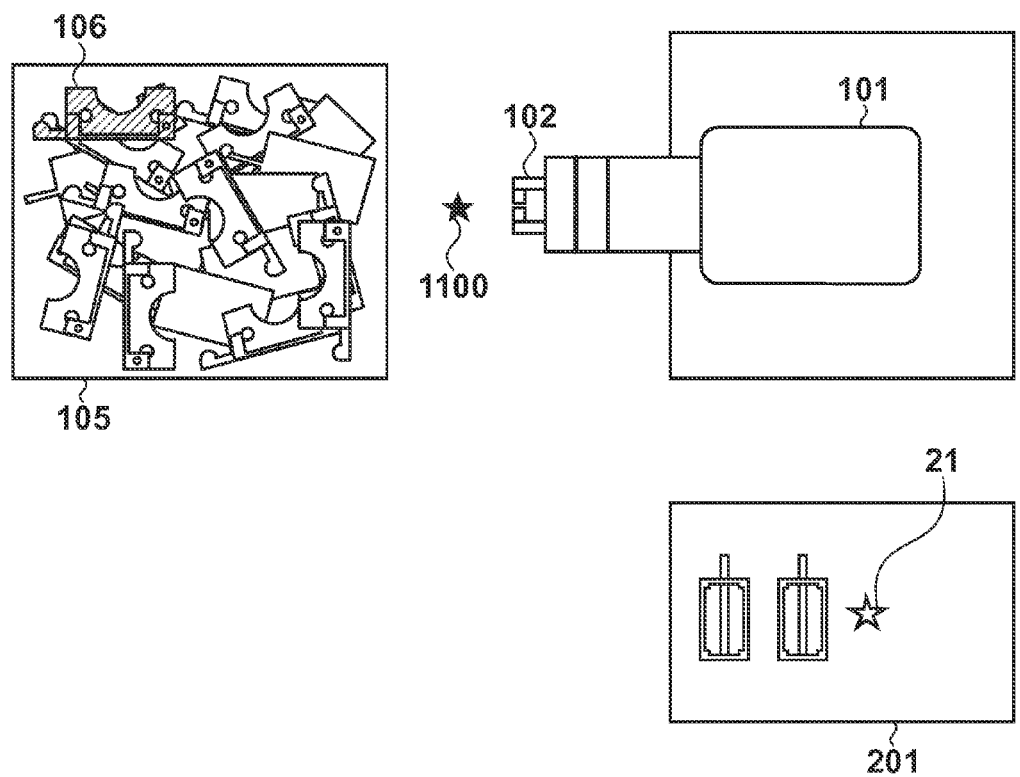
FIG. 11 shows an object gripping apparatus according to Third Embodiment as viewed from the top.

FIG. 11 shows an example in which a fixed evacuation position 1100 is set in the vicinity of the home position of the robot hand 102. The operation path candidate setting unit 111 sets a start point, an end point and a stopover point (fixed evacuation position 1100) for the paths of the first and second operation path candidates (approach path, conveyance path and return path), and calculates the operating times of the first and second operation path candidates. A known method may be used to calculate the operating times as in First Embodiment. The operations of the processing units other than the operation path candidate setting unit 111 are similar to First Embodiment. Although the above has described the case where there is one fixed evacuation position 1100 as shown in FIG. 11, a plurality of fixed evacuation positions may instead be set. In this case, one of the plurality of fixed evacuation positions may be selected in accordance with each grip position. For example, for each grip position, a fixed evacuation position that is closest thereto may be selected.

As set forth above, in the present embodiment, when the evacuation position is fixed irrespective of grip positions, it is not necessary to find out an evacuation position for each grip position as described in First Embodiment. This provides the advantage of simplifying the processing of the operation path candidate setting unit 111 and reducing its processing time.

(Fourth Embodiment)

In First Embodiment through Third Embodiment, each time a target workpiece is picked up, the sequence setting unit 104 selects an operation path of the robot arm 101 and the robot hand 102 from among a plurality of candidates.

However, the present invention is not limited in this way if it is known in advance that the result of selection made by the sequence selection unit 113 does not change even though the grip position (position of a target workpiece) changes.

For example, if the workpiece pickup time is shorter through selection of the second operation path candidate, the first operation path candidate is not selected, even in the case of the longest estimated moving time from the grip position to the evacuation position (referred to as "maximum evacuation time"). In order to make this determination, it is necessary to inspect the maximum evacuation time in advance. The maximum evacuation time can be inspected in advance by adding measurement of the maximum evacuation time to the procedure shown in FIG. 4 of First Embodiment.

With the addition of such measurement, when the sequence setting unit 104 performs processing with respect to the first target workpiece, the workpiece pickup time of the second operation path candidate in the case of the maximum evacuation time may be compared with the workpiece pickup time of the first operation path candidate, at the same time as performing the processing described in the previously-described embodiments. As a result, if the workpiece pickup time is shorter through selection of the second operation path candidate, the settings of the first operation path candidate can be omitted in pickup of subsequent target workpieces, even in the case of the maximum evacuation time.

The present invention can reduce the operating time in the case where workpieces are picked up in sequence using a robot hand.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-286623 filed on Dec. 27, 2011, which is hereby incorporated by reference herein in its entirety.

What is claimed is:

1. An apparatus comprising:
an obtaining unit configured to obtain an image including a plurality of objects, wherein the image is captured by an imaging unit;
a determination unit configured to determine a target object to be picked up and held by a holding unit from the plurality of objects based on the image obtained by the obtaining unit;
a generating unit configured to generate a first operation path along which the holding unit that has held the target object conveys the held target object to a target position and a second operation path along which the holding unit that has held the target object conveys the held target object to the target position by way of an evacuation position to which the holding unit evacuates from the imaging range of the imaging unit based on a position of the target object, wherein the evacuation position is different from the target position;
a prediction unit configured to predict, for each of the first operation path and the second operation path, a time until a next target object is picked up after the target object is held; and
path determination unit configured to determine a path by selecting from the first operation path or the second operation path based on each time predicted by the prediction unit.

2. The apparatus according to claim 1, further comprising:
an estimation unit configured to estimate positions and orientations of the plurality of objects from the image obtained by the obtaining unit;
wherein when the path determination unit determines the second operation path, estimation processing of the estimation unit for selecting a next target object and a moving operation of the holding unit along the determined path are executed in parallel.

3. The apparatus according to claim 1,
wherein the path determination unit determines the path with the shortest time.

4. The apparatus according to claim 1, further comprising:
an estimation unit configured to estimate positions and orientations of the plurality of objects from the image obtained by the obtaining unit;
wherein the determination unit determines the target object to be picked up and held by the holding unit from the plurality of objects based on an estimation result of the estimation unit.

5. The apparatus according to claim 1, further comprising:
a storing unit configured to store an evacuation position corresponding to a position of the target object determined by the determination unit;
wherein the generating unit generates the second operation path by way of the evacuation position.

6. The apparatus according to claim 1, wherein the evacuation position is a position that is outside of an imaging range of the imaging unit and that has the shortest estimated moving time from a position where the target position is held.

7. A control method for an apparatus, comprising the steps of:
causing an obtaining unit to obtain an image including a plurality of objects, wherein the image is captured by an imaging unit;
determining a target object to be picked up and held by a holding unit from the plurality of objects based on the image obtained by the obtaining unit;
generating a first operation path along which the holding unit that has held the target object conveys the held target object to a target position and a second operation path along which the holding unit that has held the target object conveys the held target object to the target position by way of an evacuation position to which the holding unit evacuates from the imaging range of the imaging unit based on a position of the target object, wherein the evacuation position is different from the target position;
predicting, for each of the first operation path and the second operation path, a time until a next target object is picked up after the target object is held; and
determining a path by selecting from the first operation path or the second operation path based on each time predicted in the predicting step.

8. A non-transitory computer-readable storage medium storing a computer program for causing a computer to execute the steps of the control method for the apparatus according to claim 7.

9. An apparatus comprising:
an obtaining unit configured to obtain an image including a plurality of objects, wherein the image is captured by an imaging unit;
a determination unit configured to determine a target object to be picked up and held by a holding unit from the plurality of objects based on the image obtained by the obtaining unit;
a generating unit configured to generate a plurality of operation paths from a position of the target object to a target position, wherein the plurality of operation paths including an operation path along which the holding unit that has held the target object conveys the held target object to the target position by way of an evacuation position to which the holding unit evacuates from the imaging range of the imaging unit, wherein the evacuation position is different from the target position; and a path determination unit configured to determine an operation path by selecting from the plurality of operation paths based on a position of the target object.

10. The apparatus according to claim 9, wherein the evacuation position is a position that is outside of an imaging range of the imaging unit.

11. A control method for an apparatus, comprising the steps of:

causing an obtaining unit to obtain an image including a plurality of objects, wherein the image is captured by an imaging unit;

determining a target object to be picked up and held by a holding unit from the plurality of objects based on the image obtained by the obtaining unit;

generating a plurality of operation paths from a position of the target object to a target position, wherein the plurality of operation paths including an operation path along which the holding unit that has held the target object conveys the held target object to the target position by way of an evacuation position to which the holding unit evacuates from the imaging range of the imaging unit, wherein the evacuation position is different from the target position; and determining an operation path by selecting from the plurality of operation paths based on a position of the target object.

12. A non-transitory computer-readable storage medium storing a computer program for causing a computer to execute the steps of the control method for the apparatus according to claim 11.

* * * * *